United States Patent
Cocchi et al.

(10) Patent No.: US 10,624,364 B2
(45) Date of Patent: Apr. 21, 2020

(54) STIRRER OF A MACHINE FOR MAKING AND DISPENSING ICE CREAM PRODUCTS

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul (IT)

(*) Notice: Subject to any disclaimer, the term of this patent is extended or adjusted under 35 U.S.C. 154(b) by 537 days.

(21) Appl. No.: 15/407,019

(22) Filed: Jan. 16, 2017

(65) Prior Publication Data
US 2017/0208833 A1 Jul. 27, 2017

(30) Foreign Application Priority Data
Jan. 21, 2016 (IT) .......................... 102016000005811

(51) Int. Cl.
*A23G 9/22* (2006.01)
*B01F 7/00* (2006.01)
(Continued)

(52) U.S. Cl.
CPC .............. *A23G 9/224* (2013.01); *B01F 7/001* (2013.01); *B01F 7/003* (2013.01); *B01F 7/0005* (2013.01); *B01F 7/00175* (2013.01); *B01F 7/00191* (2013.01); *B01F 7/00208* (2013.01); *B01F 7/00433* (2013.01); *B01F 7/00691* (2013.01);
(Continued)

(58) Field of Classification Search
CPC ... A23G 9/224; B01F 7/0005; B01F 7/00191; B01F 7/003; B01F 7/00433; B01F 7/0065; B01F 7/001; B01F 7/00175; B01F 7/00208; B01F 15/00058; B01F 15/065; B01F 2215/0021
See application file for complete search history.

(56) References Cited

U.S. PATENT DOCUMENTS 3,631,561 A * 1/1972 Aszkenas ................. B60S 1/38
15/250.41
4,732,013 A * 3/1988 Beck ........................ A23G 9/12
15/250.41

(Continued)

FOREIGN PATENT DOCUMENTS

EP 2679100 A1 1/2014
GB 2480302 A 11/2011

OTHER PUBLICATIONS

Italian Search Report dated Oct. 11, 2016 from counterpart Italian App No. IT UB20160050.

*Primary Examiner* — Nicholas J. Weiss
(74) *Attorney, Agent, or Firm* — Shuttleworth & Ingersoll, PLC; Timothy J. Klima

(57) ABSTRACT

Described is a stirrer of a machine for making and dispensing ice cream products, the stirrer rotating about an axis inside a mixing and cooling cylinder and comprising:
a body defining a plurality of helical scraping blades extending around the axis and acting on an inside wall of the mixing and cooling cylinder to be scraped;
a shaft for rotating the stirrer about the axis of rotation;
a plurality of scraping members, each designed to be coupled to a blade and equipped with elastic coupling means for the blade adapted to be elastically deformed in order to allow it to be coupled to the blade.

18 Claims, 8 Drawing Sheets

(51) Int. Cl.
*B01F 15/00* (2006.01)
*B01F 15/06* (2006.01)

(52) U.S. Cl.
CPC ...... *B01F 15/00058* (2013.01); *B01F 15/065* (2013.01); *B01F 2215/0021* (2013.01)

(56) References Cited

U.S. PATENT DOCUMENTS 9,301,537 B2 * 4/2016 Cocchi .................. A23G 9/224
2006/0171251 A1    8/2006 Busick

* cited by examiner

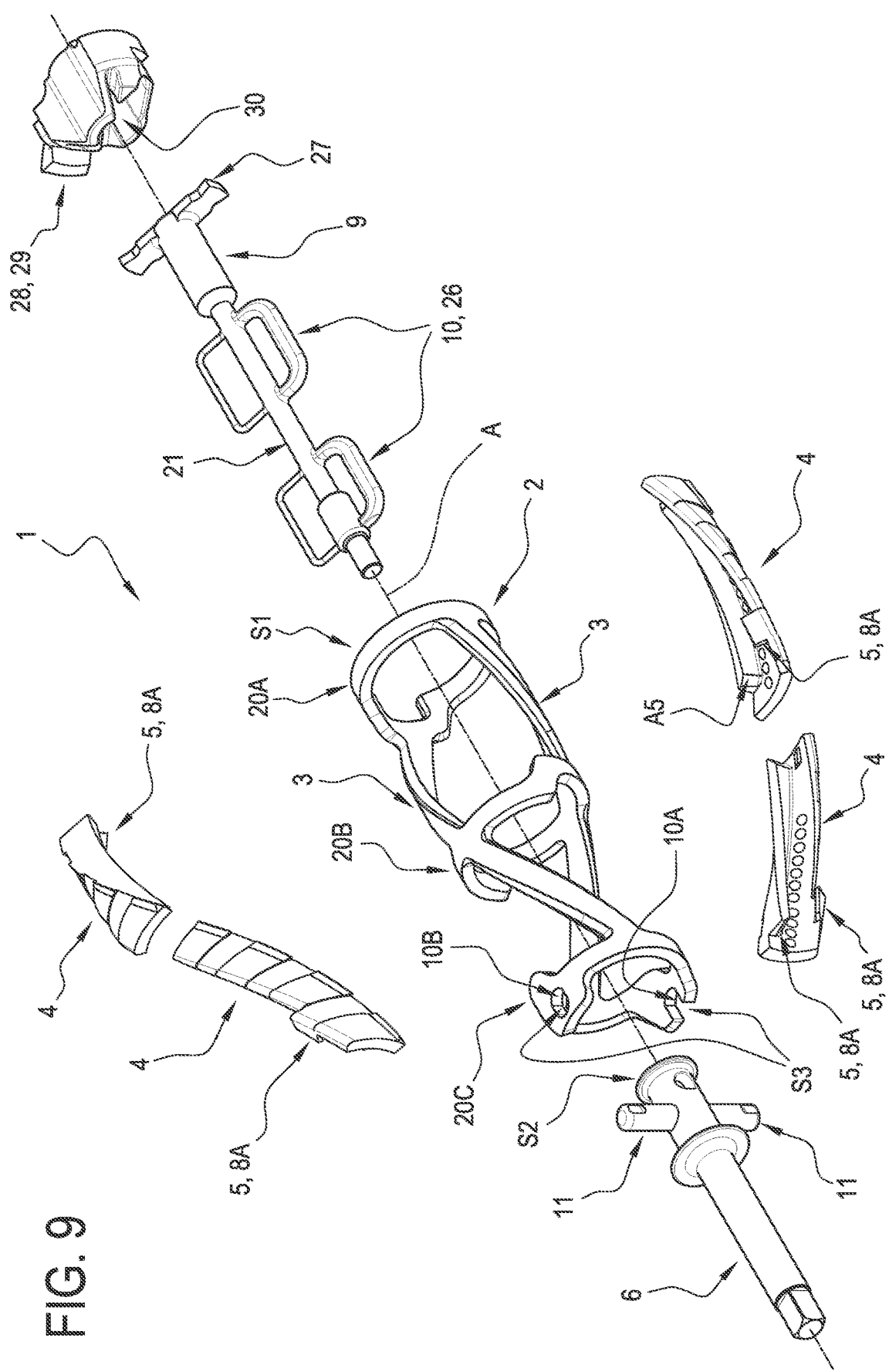

US 10,624,364 B2

STIRRER OF A MACHINE FOR MAKING AND DISPENSING ICE CREAM PRODUCTS

This application claims priority to Italian Patent Application 102016000005811 filed Jan. 21, 2016, the entirety of which is incorporated by reference herein.

BACKGROUND OF THE INVENTION

This invention relates to a stirrer of a machine for making and dispensing ice cream products.

More specifically, reference is made in this description to machines for making and dispensing ice cream, preferably soft ice cream.

Machines of this kind usually comprise a mixing and cooling cylinder inside which a basic product is mixed and cooled to obtain a finished product.

Inside the cylinder, the machine is equipped with a power-driven stirrer which not only mixes the basic product continuously to make the finished ice cream as smooth as possible but, at the same time, also causes the finished ice cream to advance towards a dispensing nozzle.

One problem suffered by these machines regards the formation of a layer of ice or frozen basic product on the inside wall of the mixing and freezing cylinder.

Indeed, while the product is being stirred, pieces of this ice layer come away from the cylinder wall and fall into the product being made.

This not only worsens the quality of the finished ice cream, which is less smooth on account of the pieces of ice of various sizes inside it but also creates the risk of damaging the stirrer because the pieces of ice impact the stirrer as it rotates.

For this reason, prior art stirrers are equipped with elements, called "scrapers", which prevent the formation of the layer of ice by continuously scraping the inside wall of the mixing and freezing cylinder while the stirrer rotates.

Normally, however, during use of the machine, the stirrer is never fully immersed in the product or in the ice cream being processed which means that in very long operating cycles, a certain amount of basic product, ice cream, or ice tends to stick and build up on the stirrer.

These build-ups remain on the stirrer and are not mixed into the rest of the product being processed which means that over time, they harbor bacteria, which reduces the quality of the ice cream produced and makes it unsafe for consumption.

It is therefore necessary to subject the stirrers and, in particular, the scrapers, to periodic cleaning cycles.

Some prior art types of stirrers consist of a single metallic "body" and the scrapers form an integral part of the stirrer structure. These stirrers have a very complex structure and reaching all parts of it is very difficult. Correct and thorough cleaning of all its parts is not therefore guaranteed.

In other types of stirrers known in the prior art, the scraper is a separate part which is mounted to the stirrer using springs.

These systems, however, are somewhat awkward to dismantle and their maintenance is a lengthy, painstaking task.

Moreover, owing to the complexity of these systems, correct cleaning of all the parts is, again, not guaranteed and, in this case, too, there is the risk of contamination by bacteria.

SUMMARY OF THE INVENTION

This invention therefore has for an aim to provide a stirrer of a machine for making and dispensing ice cream products which overcomes the above mentioned disadvantages of the prior art.

More specifically, the aim of the invention is to provide a stirrer which is quicker and easier to clean in all its parts.

The technical purpose indicated and the aims specified are substantially achieved by a stirrer of a machine for making and dispensing ice cream products, comprising technical features as disclosed herein.

BRIEF DESCRIPTION OF THE DRAWINGS

This and other innovative features of the invention, together with its advantages, will become more apparent from the following description of a preferred embodiment of it, illustrated by way of non-limiting example in the accompanying drawings, in which:

FIG. 9 is an exploded perspective view of the stirrer of FIG. 6.

DESCRIPTION OF THE PREFERRED EMBODIMENTS

Figure 1:
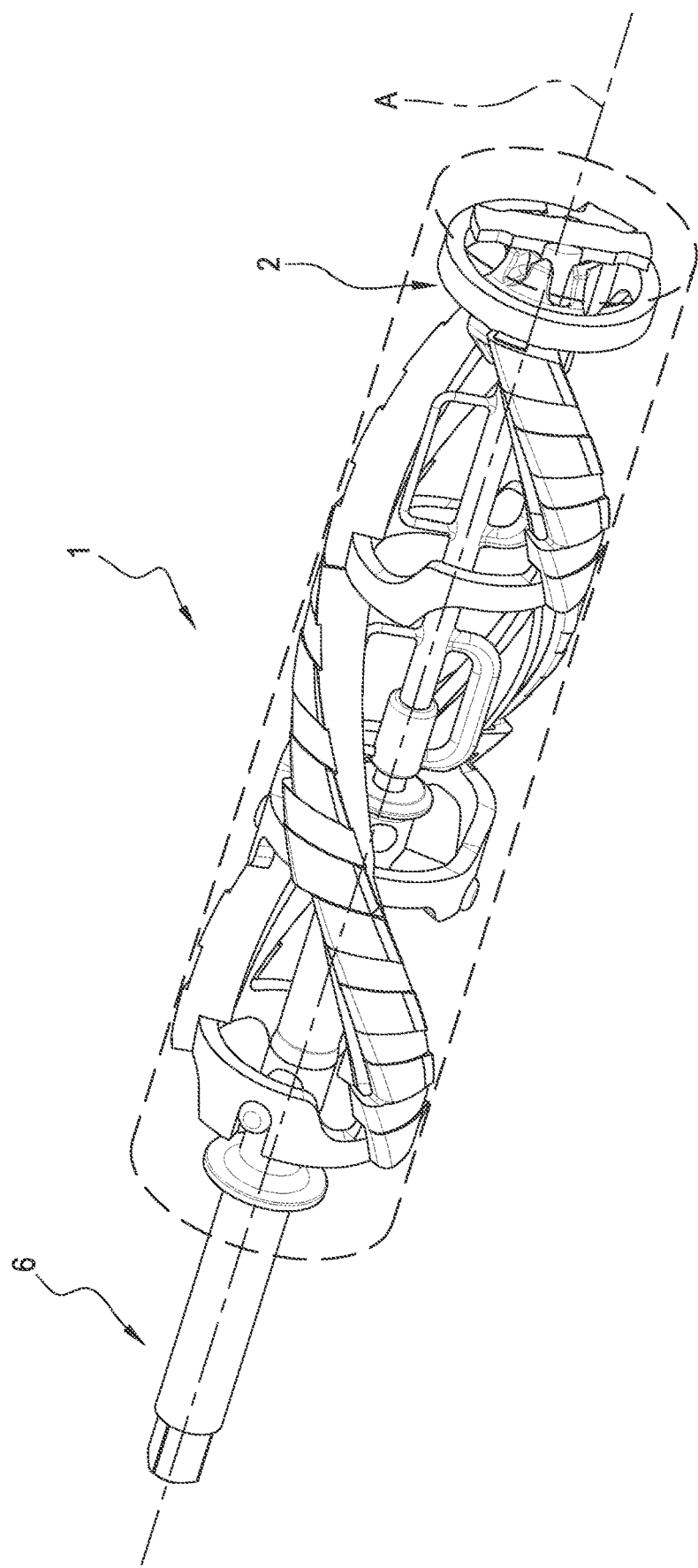
FIG. 1 is a perspective view of a stirrer according to a first embodiment of this invention.
Figure 2:
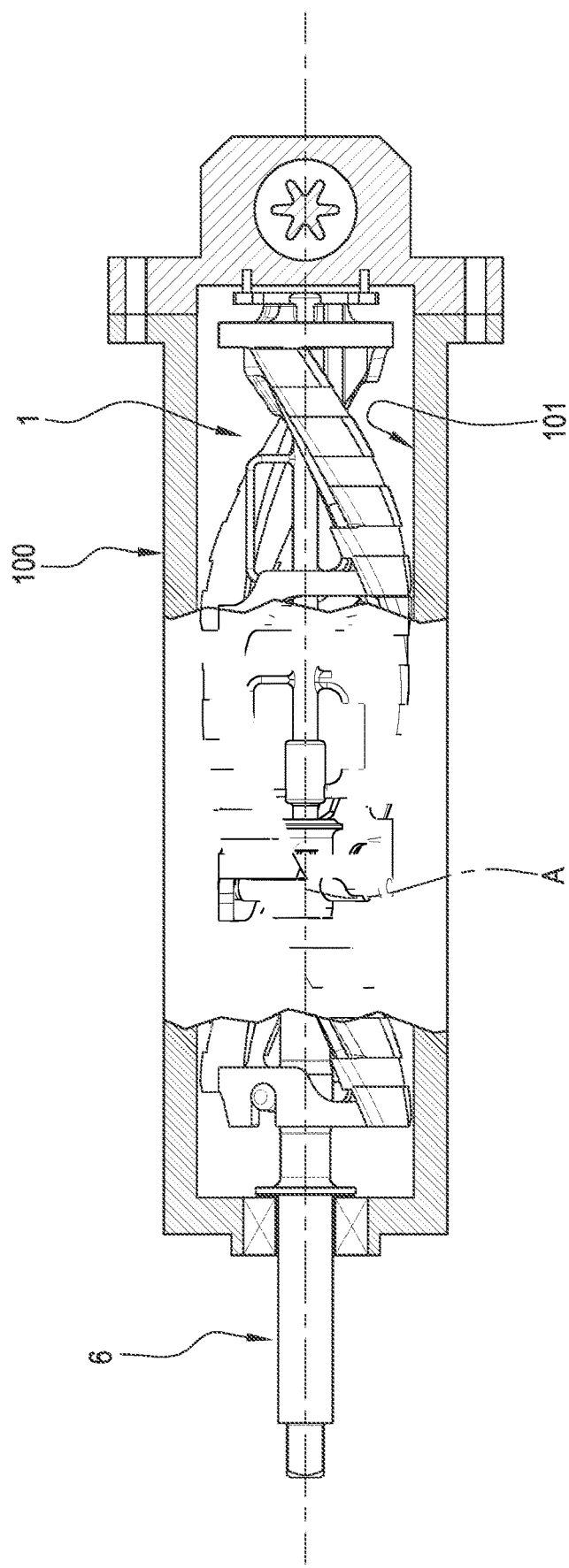
FIG. 2 is a side view in cross section of the stirrer of FIG. 1 installed in a mixing and cooling cylinder.
Figure 3:
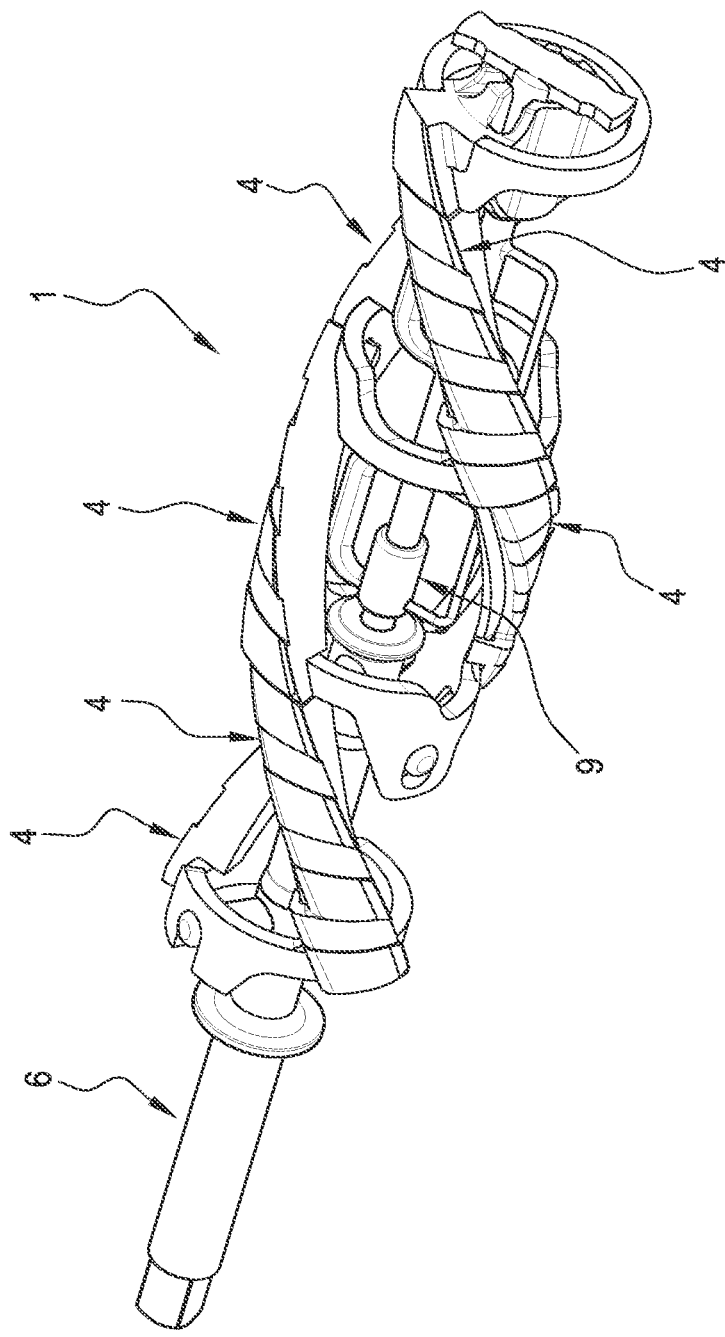
FIG. 3 is a perspective view of the stirrer of FIG. 1.

The numeral 1 in FIG. 1 denotes in its entirety a stirrer according to this invention.

More specifically, the stirrer 1 is a stirrer of the type designed to be installed in a mixing and cooling cylinder of a machine for making and dispensing ice cream products, such as, for example, soft ice cream.

The mixing and cooling cylinder extends mainly along an axis A.

The stirrer 1 comprises:

a body 2 defining a plurality of helical scraping blades 3 extending around the axis A and acting on an inside wall of the mixing and cooling cylinder to be scraped;

a shaft 6 for rotating the stirrer 1 about the axis of rotation A;

a plurality of scraping members 4, each designed to be coupled to a blade 3 and equipped with elastic coupling means 5 for the blade 3 adapted to be elastically deformed in order to allow it to be coupled to the blade 3.

According to another aspect, the stirrer 1 comprises, for each blade 3, a plurality of scraping members 4 coupled to the blade 3 and positioned (in use) substantially in mutual contact to define continuity of material between one scraping member 4 and another.

Preferably, the body 2 defining a plurality of blades 3 is made as a single part.

Still more preferably, the body 2 defining a plurality blades 3 is made as a single part of metallic material.

Preferably, the body 2 defining a plurality blades 3 is made as a single part (by stock removal) from a tubular member.

It should be noted that the body 2 is thus advantageously particularly robust and easy to make and, precisely because it is a single part, does not need to be assembled.

According to another aspect, the elastic coupling means 5 for coupling the scraping member 4 to the blade 3 are defined by end portions 8A of the scraping member 4 adapted to be elastically deformed and configured to be coupled to the blade 3.

More precisely, the end portions 8A of the scraping member 4 are defined by (non-scraping) anchoring projections.

Still more precisely, the end portions 8A of the scraping member 4 extend bilaterally relative to the main direction of extension of the scraping member 4 so as to allow the scraping member 4 to be bilaterally coupled to the blade 3.

Preferably, the stirrer 1 comprises a pair of blades 3.

According to another aspect, the stirrer 1 comprises a first seat S1 and a second seat S2 facing each other (and in different positions) relative to the direction of the axis A.

The first seat S1 is formed in the body 2 and the second seat S2 is formed in the shaft 6.

Also according to this aspect, the stirrer 1 further comprises a counter-stirrer member 9 adapted to be inserted into the first and second seats (S1,S2) centrally of the body.

In other words, the counter-stirrer member 9 is configured to be inserted into the body 2 to be (rotatably) coupled in the first and second seats (S1,S2).

The counter-stirrer member 9 is, in use, rotatably coupled to the body 2.

In other words, the counter-stirrer member 9 is coupled to the body 2 (and to the shaft 6) in such a way as to be able to rotate freely relative to the body 2 (and shaft 6) about an axis which is parallel to the axis A.

It should be noted that the counter-stirrer member 9 comprises a plurality of radially protruding (U-shaped) vanes 10.

The counter-stirrer member 9 is made as a single part (preferably of metal).

It should be noted that the counter-stirrer member 9 is essentially designed to prevent a compact block of (iced) product from forming in the middle of the mixing and cooling cylinder.

It should be noted that the scraping members 4 are made preferably of plastic material.

According to another aspect, the body 2 comprises at least one seat S3 for receiving the shaft 6 and the shaft 6 is configured to be removably fixable to the body 2 inside the seat S3.

It should be noted that the body 2 can thus be uncoupled from the shaft 6 in a particularly quick and easy manner.

In effect, the body 2, like the stirring member 9 and the scraping members 4 must normally be removed (that is, taken out of the mixing and cooling cylinder) for cleaning/maintenance purposes.

Figure 4:
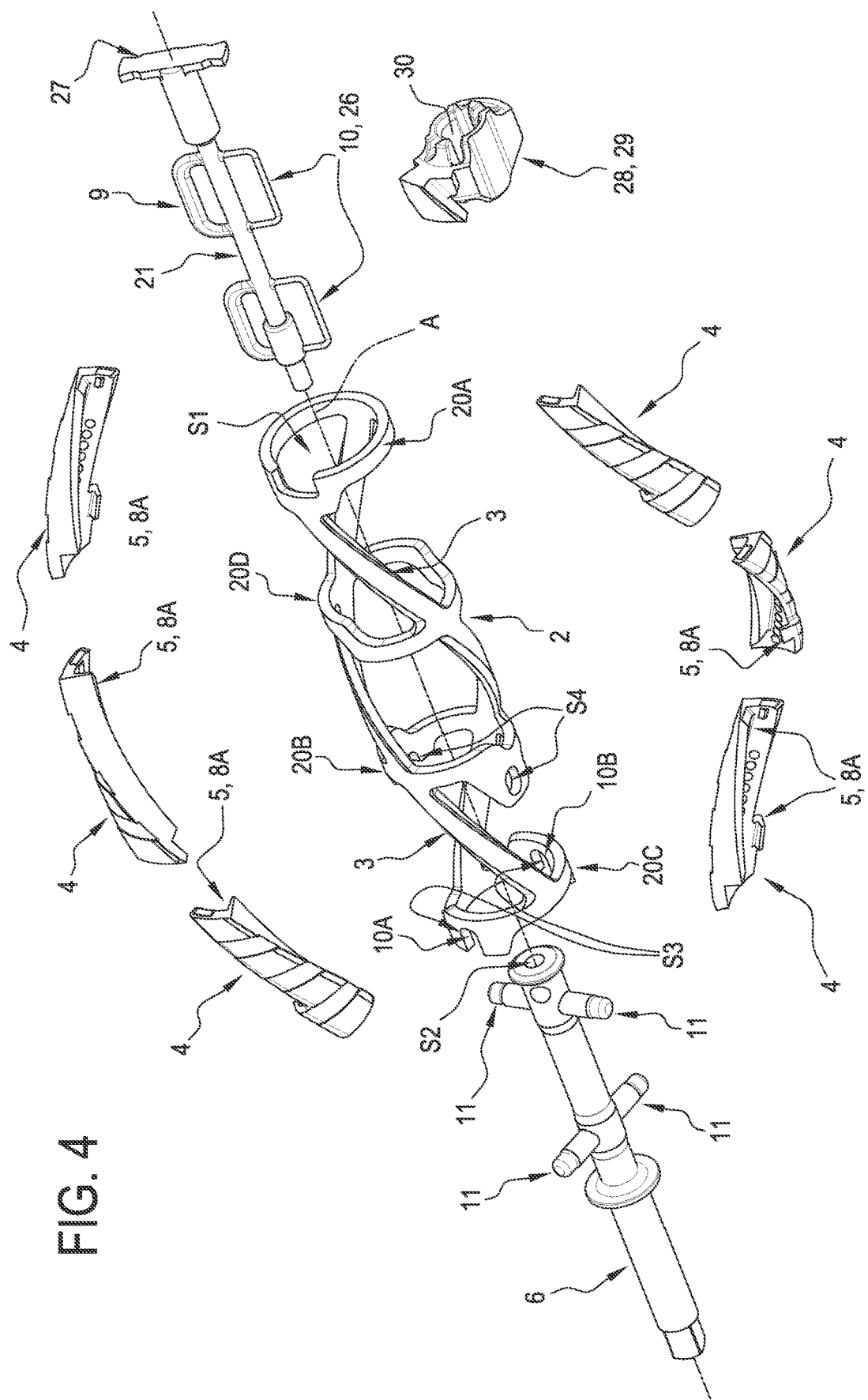
FIGS. 4 and 5 are exploded perspective views of the stirrer of FIG. 1.
Figure 5:
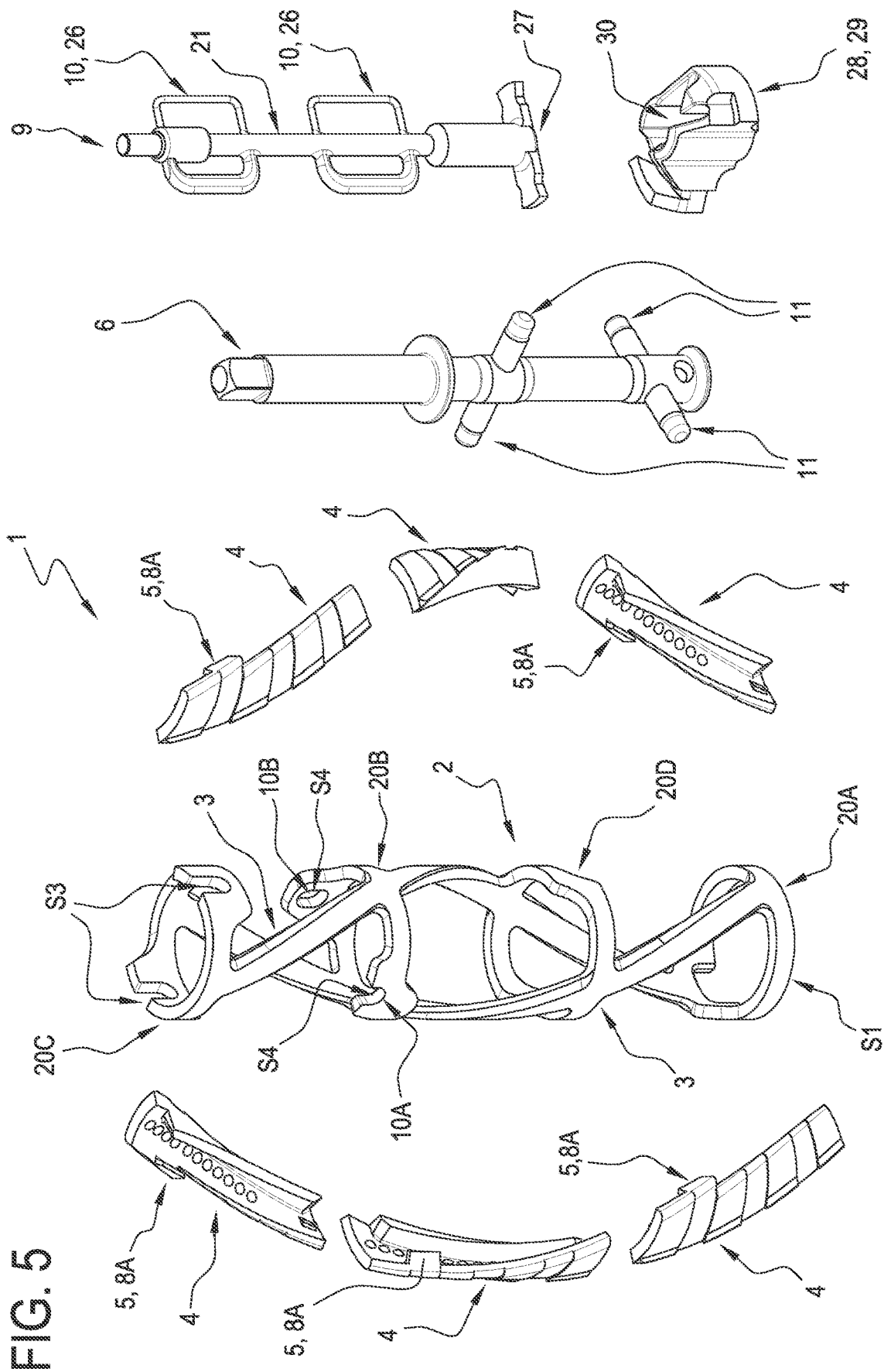
Figure 6:
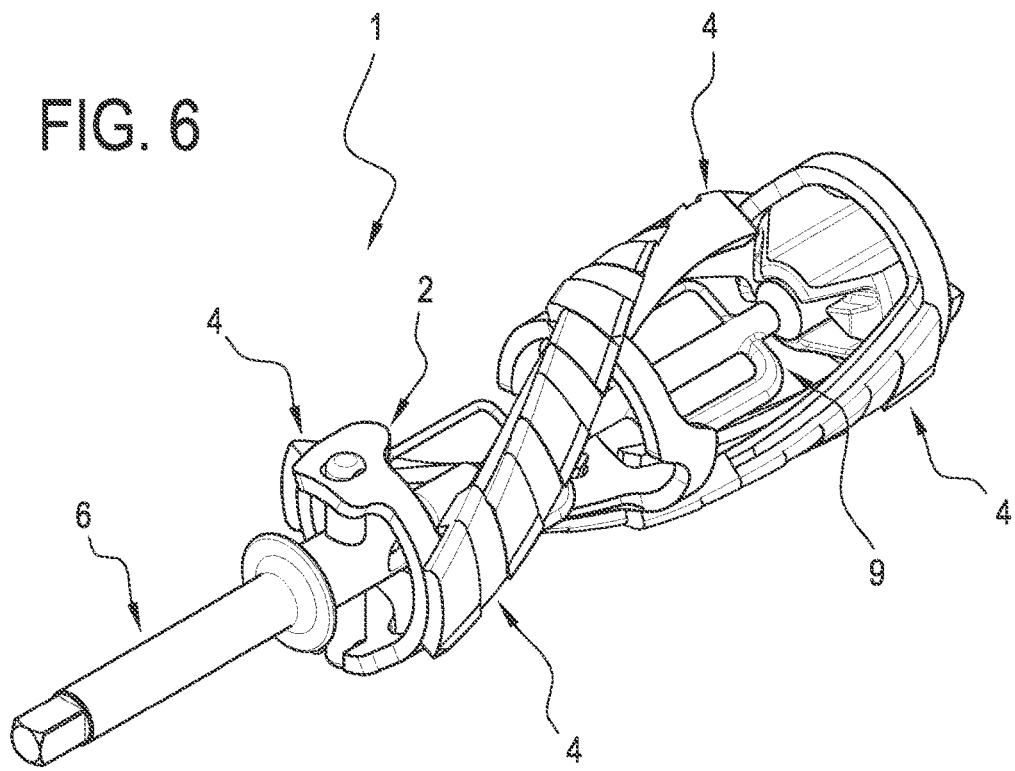
FIG. 6 shows a perspective view of the stirrer according to a second embodiment of the invention.
Figure 7:
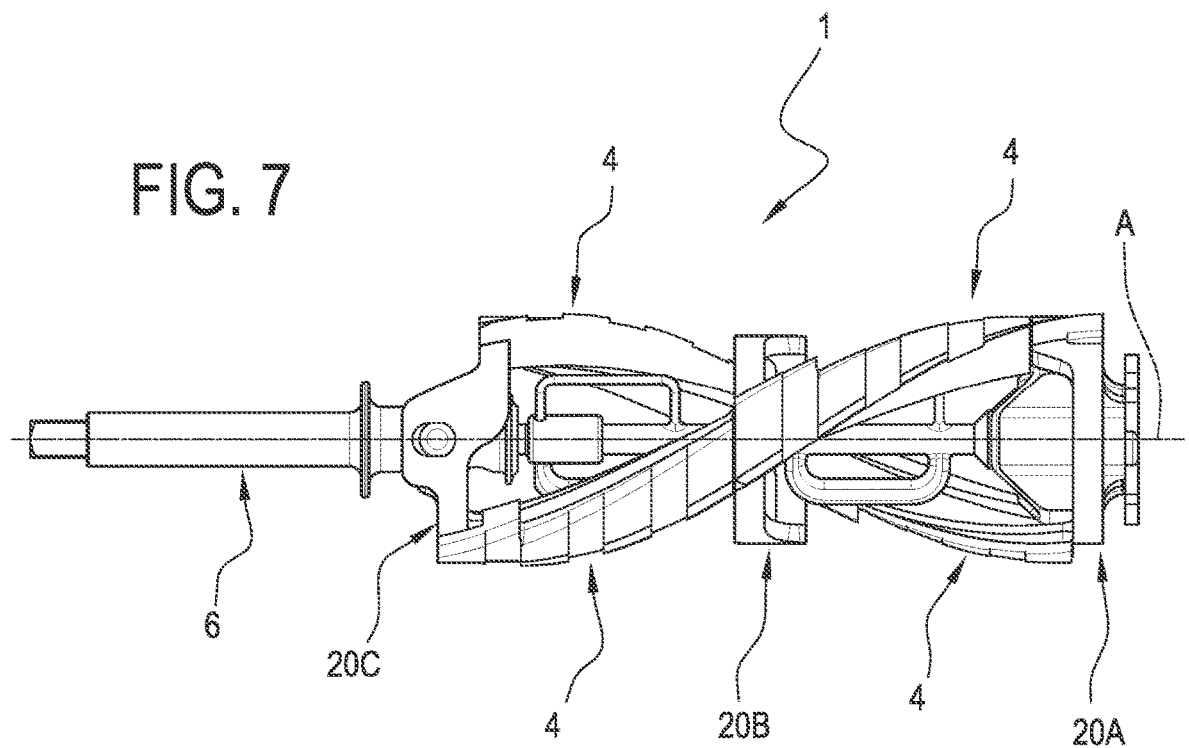
FIG. 7 is a side view of the stirrer of FIG. 6.
Figure 8:
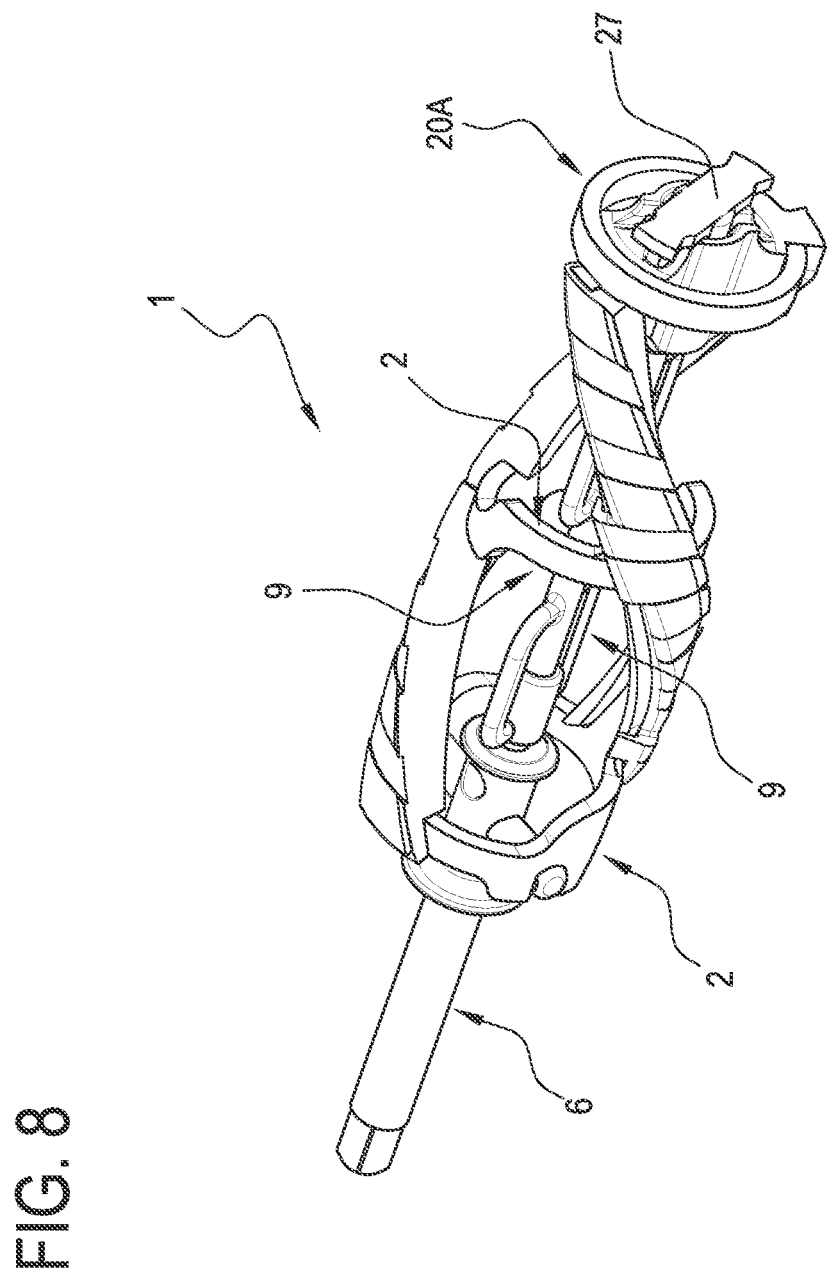
FIG. 8 is a perspective view of the stirrer of FIG. 6.

According to one aspect, illustrated in the embodiments shown in FIGS. 4, 5 and 9, the at least one seat S3 for receiving the shaft 6 is defined by a pair of openings (10A, 10B) formed in the body 2.

Preferably (FIG. 9), at least one of the openings 10A has an open profile along the direction of extension of the axis A and the other opening 10B is closed (that is, has a closed profile) along the direction of extension of the axis A.

The shaft has a plurality of radial protrusions 11 configured to be inserted into the receiving seat S3.

More precisely, the radial protrusions 11 are adapted to be inserted into the openings (10A, 10B).

That way, the shaft 6 can be inserted first into the opening 10A which is closed in the direction of extension of the axis A and then into the opening 10B which is open in the direction of extension of the axis A.

That way, the shaft 6 is rotatably locked (coupled) to the body 2 in such a way as to transmit the drive torque for driving the body 2 in rotation.

The fact that there is an opening 10A which is closed along the direction of extension of the axis A means that the shaft is coupled to the body 2 more securely, in particular along the direction of extension of the axis A.

It should be noted that in the embodiment illustrated in FIGS. 4 and 5 the body 2 comprises a first seat S3 for receiving the shaft 6 and a second receiving seat S4, located at different distances along the direction of extension of the axis A and the shaft 6 is configured to be removably fixable to the body inside the first seat S3 and the second seat S4.

The first and second seats (S3,S4) each comprise a pair of openings (10A,10B).

Preferably, both of the openings (10A,10B) of the first and second seats (S3,S4) are open (that is, have an open profile) along the direction of extension of the axis A.

As illustrated in FIGS. 4 and 5, the first seat S3 comprises openings (10A,10B) whose profiles are open along the direction of extension of the axis A, whilst the second seat S4 comprises an opening 10A whose profile is open along the direction of extension of the axis A and an opening 10B whose profile is closed along the direction of extension of the axis A (a protrusion 11 of the shaft 6 is engaged in the opening 10B).

In this embodiment, the shaft 6 comprises two pairs of radial protrusions 11 located at different longitudinal positions along the shaft 6 itself.

The radial protrusions 11 are adapted to be inserted into the openings (10A,10B) of the first and second seats (S3,S4).

It should be noted that the shaft 6 is connected to motor means, that is, to an actuator adapted to drive it in rotation.

During rotation of the shaft, the blades 3 are driven in rotation as one with the shaft 6, whilst the counter-stirrer member 9, which is rotatably coupled to the shaft 6 does not follow its motion.

The helical form of the blades 3 around the axis A creates a central empty space, whose utility and function are described in more detail below.

The blades 3, in particular the scraping members 4, apply a continuous scraping action on the inside wall of the mixing and cooling cylinder 100 during processing of the product so as to prevent the formation of the aforementioned layer of ice which, if it were to form and fall into the product being made, would spoil product quality and damage or break the stirrer 1.

The scraping member 4 is equipped, at a first portion 4 of it, with a plurality of scrapers which come into contact with the inside wall 101 of the mixing and cooling cylinder 100 as the stirrer 1 rotates.

As shown in the accompanying drawings, the scrapers are spaced apart in order to allow better aeration of the product being processed.

The adoption of a plurality of scrapers 4 on each scraping member also allows the product being processed to be mixed more uniformly, thus obtaining a smoother, better quality ice cream.

The solution described is particularly advantageous when one or more of the scraping members 4 needs to be substituted and, above all, to facilitate cleaning of the mixing and cooling cylinder and of the stirrer 1.

The scraping members 4 are made of a plastic material so as to reduce friction with the inside wall of the mixing and cooling cylinder, which is preferably made of stainless steel.

The use of scraping members 4 made of plastic reduces wear caused by friction against the inside wall, thus increasing their working life, and also limits the costs of manufacturing and replacing the scraping members 4 themselves.

Each scraping member 4 is coupled to the blade 3 by deformation of the elastic means 5, that is, of a portion of the scraping member 4 itself: this portion, by being deformed, allows the scraping member 4 to be coupled to the blade 3.

Preferably, the scraping members 4 are in contact with each other in consecutive pairs thus forming an uninterrupted piece of material between one member and the next.

In other words, the scraping members 4 are preferably placed in contact with each other without creating small gaps between one scraping member 4 and the adjacent one, where product or ice might collect, allowing bacteria to thrive which would contaminate the product being processed.

Furthermore, the scraping members 4 thus abutting against each other define a continuity of material between one scraping member 4 and the next.

In other words, it is as if each helical scraper 3 had a single scraping member 4, with the advantage of mixing the product more uniformly, giving it a smoother consistency and allowing the finished product to advance at a more constant rate towards the dispensing zone Z.

As shown in the accompanying drawings, the body 2 comprises at least a first annular member 20A. The blades 3 are connected to the first annular member 20A at the first end.

The body 2 also has a second annular member 20B connected to the blades 3 at a position substantially half way between the first end and the second end of the blades 3.

The body 2 also has a third annular member 20C.

The blades 3 are connected to the third annular member 20C at the second end of the blades 3.

It should be noted that the seat S3 for receiving the shaft 6 is formed in the third annular member 20C.

Furthermore, in the embodiment shown in FIGS. 4 and 5, the seat S4 for receiving the shaft 6 is formed in the second annular member 20B.

Also in the embodiment shown in FIGS. 4 and 5, the body 2 also has a fourth annular member 20D connected to the blades 3 at a position substantially half way between the first end and the second end of the blades 3.

In the preferred embodiment, the stirrer 1 has two blades 3.

Each of the blades 3 is connected to the first annular member 20A, to the second annular member 20B and to the third annular member 20C at diametrically opposite points of the circumferential edge of the respective annular member (20A,20B,20C).

The first member 20A and the third 20C are coaxial with the axis of rotation A.

Furthermore, the second annular member 20B is also preferably coaxial with the axis of rotation A.

Furthermore, in the embodiment illustrated in FIGS. 4 and 5, the fourth annular member 20D, too, is preferably coaxial with the axis of rotation A.

More specifically, the first annular member 20A and the third annular member 20C define between the blades 3 the aforementioned central empty space.

The central empty space is designed to house the counter-stirrer member 9.

The counter-stirrer member 9 comprises a central stem 21, whose axis of extension coincides with the axis of rotation A.

The counter-stirrer member 9 is connected, at a first end 24 of the stem 21, to the rotation shaft 6.

More specifically, this connection allows the counter-stirrer member 9 to turn freely relative to the rotation shaft 6 in such a way that, during operation, the counter-stirrer 9 and the blades 3 are movable in rotation relative to each other.

The counter-stirrer member 9 further comprises stirring members 26, consisting of rod-like members bent into a U shape and solidly connected, in diametrically opposite pairs, to the stem.

At a second end 25 of the stem 21, opposite to the first end, the counter-stirrer member 9 has a plate 27 which is fixed to the stem 21 and which engages the mixing and cooling cylinder in known manner.

That way, during rotation of the stirrer 1, the counter-stirrer member 9 remains fixed relative to the blades 3 and thus, as stated above, the blades 3 and the mixing member 9 are movable in rotation relative to each other.

The stirrer 1 comprises locking means 28 which engage solidly with the blades 3 at the respective second ends thereof and which are such as to prevent the scraping members 4 from sliding off during the rotation of the stirrer 1.

More precisely, the locking means 28 comprise a body 29 which solidly engages the blades 3.

More specifically, the body 29 is substantially "cap-like" in shape and solidly engages the first annular member 20A.

The body 29 has a central hole 30, through which the stem 21 of the mixing member 9 passes, and the aforementioned plate 27 is located on the side of the body 29 opposite to the stirring members 26.

Thus, during operation, the "cap-like" body 29, being integral with the body 2, rotates about the stem of the counter-stirrer member 9, which is integral with the mixing and cooling cylinder by way of the plate 27.

For each blade 3, the body 29 has an appendage defining a stop adapted to prevent the scraping members 4 from sliding off during rotation of the stirrer 1.

The stirrer 1 as described offers numerous advantages.

First of all, the stirrer 1, as described, can be quickly and easily dismantled into all its parts.

For this reason, the stirrer 1 is easy to clean because all its parts are fully accessible.

More specifically, as described in detail above, cleaning and maintenance operations are easier because the scraping members 4 can be uncoupled from the blades 3 by an operator without using special instruments or tools.

The scraping members 4 might also be different in geometry and in the structure of the scrapers, for example to adapt the operation of the stirrer 1 to specific properties of the product being processed, such as density, viscosity, etc.

Furthermore, the use of a plurality of scraping members 4 does not adversely affect the correct mixing of the product being processed or the scraping action because the scraping members 4 are placed in close contact with each other to create a continuity of material so that it is as if each blade 3 were equipped with a single scraping member 4.

The continuity of the material thus allows the inside wall of the mixing and cooling cylinder to be scraped more evenly and continuously.

The continuity of material also prevents small gaps from being created between one scraping member 4 and another, where deposits of product or ice can form between the scraping members 4.

Lastly, the use of scraping members 4 made of plastic reduces friction with the inside wall of the mixing and cooling cylinder, thus reducing wear, increasing working life and limiting manufacturing and replacement costs.

What is claimed is:

1. A stirrer of a machine for making and dispensing ice cream products, the stirrer being suitable for rotating about an axis inside a mixing and cooling cylinder of the machine, the stirrer comprising:
   a body defining a plurality of helical scraping blades extending around the axis and suitable for acting on an inside wall of the mixing and cooling cylinder to be scraped;
   a shaft for rotating the stirrer about the axis;
   a plurality of scraping members, each including an elastic coupler suitable for elastic deformation for coupling to one of the plurality of helical scraping blades;
   wherein the body comprises a seat for receiving the shaft and the shaft is configured to be removably fixable to the body inside the seat;
   wherein the seat is defined by a pair of openings formed in the body;
   wherein one of the pair of openings has an open profile along a direction of extension of the axis and the other of the pair of openings has a closed profile along the direction of extension of the axis.

2. The stirrer according to claim 1, and further comprising, for each blade of the plurality of helical scraping blades, a plurality of scraping members coupled to the each blade and positioned in mutual contact to define a continuity of material between one scraping member and another.

3. The stirrer according to claim 1, wherein the body is a single part.

4. The stirrer according to claim 1, wherein the body is a single part formed by stock removal from a tubular member.

5. The stirrer according to claim 1, wherein the elastic coupler is defined by end portions of the scraping member suitable for elastic deformation and coupling to the one of the plurality of helical scraping blades.

6. The stirrer according to claim 5, wherein the end portions of the scraping member are defined by anchoring projections.

7. The stirrer according to claim 1, wherein the body comprises a first seat and the shaft comprises, at one end, a second seat, the two seats facing each other along the axis and wherein the stirrer further comprises a counter-stirrer member adapted to be inserted into the first and second seats centrally of the body.

8. The stirrer according to claim 7, wherein the counter-stirrer member comprises a plurality of radially protruding vanes.

9. A stirrer of a machine for making and dispensing ice cream products, the stirrer being suitable for rotating about an axis inside a mixing and cooling cylinder of the machine, the stirrer comprising:
   a body defining a plurality of helical scraping blades extending around the axis and suitable for acting on an inside wall of the mixing and cooling cylinder to be scraped;
   a shaft for rotating the stirrer about the axis;
   a plurality of scraping members, each including an elastic coupler suitable for elastic deformation for coupling to one of the plurality of helical scraping blades;
   wherein the body comprises a seat for receiving the shaft and the shaft is configured to be removably fixable to the body inside the seat;
   wherein the seat is defined by a pair of openings formed in the body;
   wherein both of the pair of openings have an open profile along a direction of extension of the axis.

10. The stirrer according to claim 1, wherein the body comprises a first seat for receiving the shaft and a second seat for receiving the shaft, positioned at different distances along at direction of extension of the axis and the shaft is configured to be removably fixable to the body inside the first seat and the second seat.

11. The stirrer according to claim 9, and further comprising, for each blade of the plurality of helical scraping blades, a plurality of scraping members coupled to the each blade and positioned in mutual contact to define a continuity of material between one scraping member and another.

12. The stirrer according to claim 9, wherein the body is a single part.

13. The stirrer according to claim 9, wherein the body is a single part formed by stock removal from a tubular member.

14. The stirrer according to claim 9, wherein the elastic coupler is defined by end portions of the scraping member suitable for elastic deformation and coupling to the one of the plurality of helical scraping blades.

15. The stirrer according to claim 14, wherein the end portions of the scraping member are defined by anchoring projections.

16. The stirrer according to claim 9, wherein the body comprises a first seat and the shaft comprises, at one end, a second seat, the two seats facing each other along the axis and wherein the stirrer further comprises a counter-stirrer member adapted to be inserted into the first and second seats centrally of the body.

17. The stirrer according to claim 16, wherein the counter-stirrer member comprises a plurality of radially protruding vanes.

18. The stirrer according to claim 9, wherein the body comprises a first seat for receiving the shaft and a second seat for receiving the shaft, positioned at different distances along a direction of extension of the axis and the shaft is configured to be removably fixable to the body inside the first seat and the second seat.

* * * * *